United States Patent Office 3,309,048
Patented Mar. 14, 1967

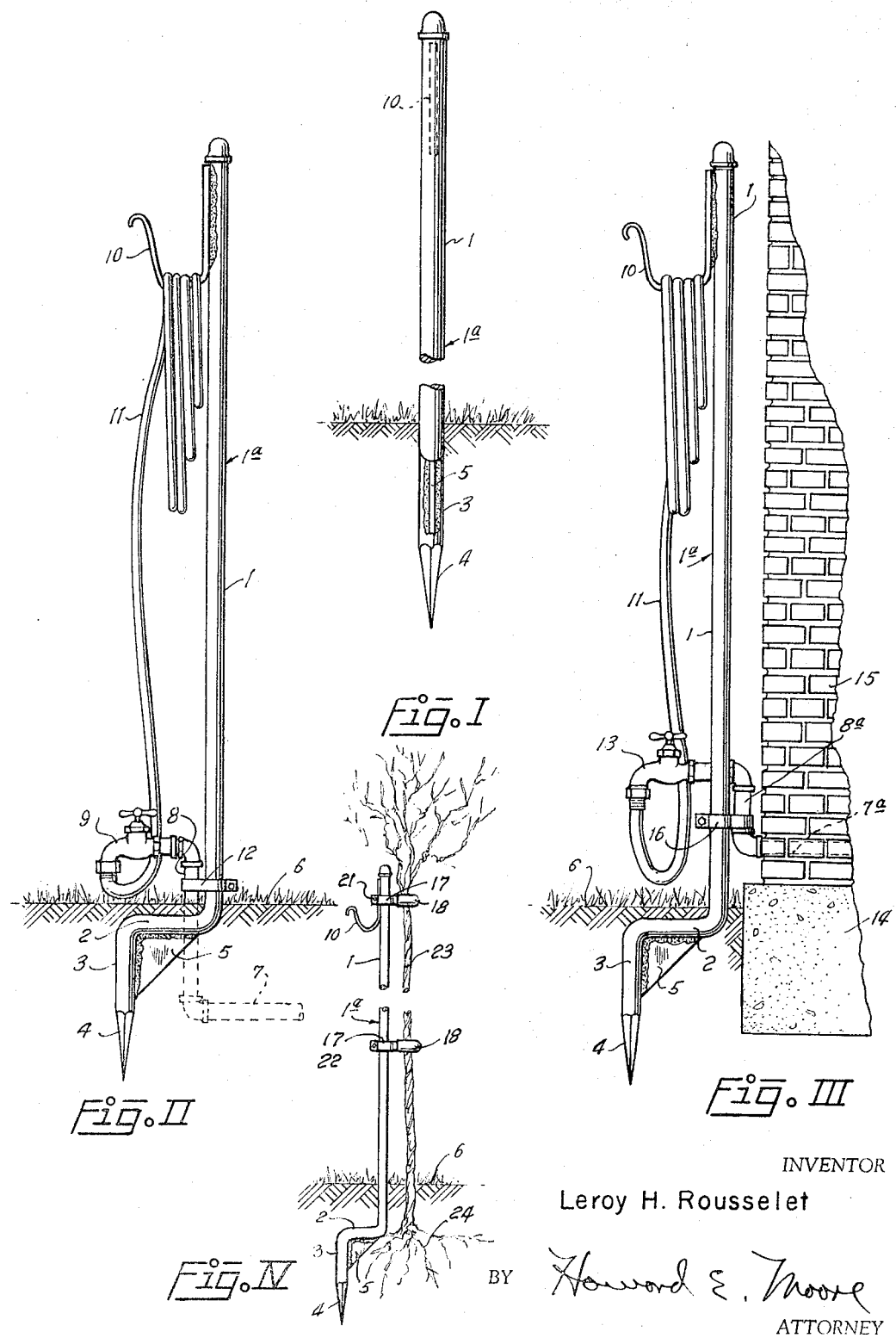

3,309,048
SUPPORT DEVICE
Leroy H. Rousselet, Dallas, Tex., assignor to Pogo Tool
Corporation, a corporation of Texas
Filed Mar. 15, 1965, Ser. No. 439,880
7 Claims. (Cl. 248—87)

This invention is concerned with a support or rack on which a garden hose or the like may be wound and stored while not in use, or by which a tree or similar object may be stabilized and supported, and is particularly concerned with such a support device which is transportable and which may be mounted in the ground adjacent a water faucet so that the hose may be wound thereon for storage while attached at one end to the faucet, and which may be secured to the faucet to stabilize same while the hose is in use, or which may be mounted in the ground adjacent a tree to support it.

Garden hose storage racks are customarily placed in the storage room or garage and it is necessary to detach the hose from the faucet, carry it to the storage rack, and wind same thereon, and to reverse this procedure when it is desired to use the hose.

This procedure is cumbersome and inconvenient, and as a result the ordinary householder usually leaves the garden hose attached to the faucet and lying on the ground where it presents an unsightly appearance as well as providing an obstruction to mowing the lawn, or otherwise utilizing the lawn area where the hose is disposed.

The present invention is intended to provide a garden hose storage rack which may be quickly and easily mounted in the ground adjacent the water faucet and is attached thereto, so that it does not occupy any unnecessary space in the yard, and extends upwardly from the water faucet in a convenient position where the hose may be quickly wound thereon for storage without disconnecting the hose from the faucet.

It is, therefore, a primary object of the invention to provide a transportable water hose storage rack which may be mounted adjacent a water faucet and attached thereto in a manner to extend upwardly therefrom to provide a storage rack for garden hose attached to the faucet and to provide a stabilizing support for the riser pipe of the water faucet.

Another object of the invention is to provide such a water hose storage rack which has a right angular bend therein, adjacent the ground penetrating point thereon so that the storage rack may be positioned adjacent a water faucet located in a position remote from the foundation and wall of the house, but permits same to be firmly mounted adjacent a faucet located in close proximity to a foundation and wall, yet the ground penetrating point thereof is spaced from the foundation or wall for secure mounting.

A still further object of the invention is to provide such a water hose storage rack having a right angular horizontal portion thereof adjacent the ground penetrating point, whereby the right angular portion can be pressed into the earth to provide an anchor for the device to prevent it from rotating after being anchored in the ground.

A still further object of the invention is to provide such a hose storage rack having a right angular horizontal portion thereon adjacent the penetrating point thereof, with a downwardly extending member, such as a gusset or web, extending downwardly from the horizontal portion to penetrate the earth to support the hose rack against rotation after being placed into the ground.

Another object of the invention is to provide such a hose storage rack which will securely anchor the hydrant against movement, whether the hydrant is spaced from the foundation and wall of the house or whether it extends through the foundation or wall of the house.

A general object of the invention is to provide a simple, easily transportable garden hose storage rack which may be quickly mounted adjacent a water faucet, wherever it may be located, which does not occupy undue space in the yard and is easily and quickly accessible for storage of water hose thereon without disconnecting the water hose from the faucet.

Another object of the invention is to provide such a support device which may be employed to provide a firm and steady support for a tree or other upright member.

Other and further objects of the invention will become apparent upon reading the detailed specifications hereinafter following and by referring to the drawing annexed hereto.

A suitable embodiment of the invention is shown in the attached drawing wherein, FIGURE I is a rear elevational view of the hose support device taken from the right side of FIGURE II;

FIGURE II is a side elevational view of the hose support member mounted adjacent a water faucet which is spaced from the foundation and wall of a house;

FIGURE III is a side elevational view of the hose support member mounted adjacent to the foundation and wall of a house wherein the riser portion of the support member is attached to a faucet which extends outwardly through the wall of the house above the foundation; and FIGURE IV is a side elevational view of the device employed to brace and support a tree.

Numeral references are employed to indicate the various parts of the device shown in the drawing and like numerals indicate like parts throughout the various figures of the drawing.

Referring first to FIGURES I and II the hose storage device consists of a body 1 made of a continuous piece of metallic rod or tubular material which is shaped and formed to provide an elongated upright portion 1a, a horizontal portion 2, which is right angular to the upright portion 1a, and a vertical ground penetrating portion 3, which is turned in right angular relationship to the horizontal portion 2.

A pointed end 4 is provided on the vertical portion 3 to facilitate the penetration of the earth 6.

A downwardly extending member 5 is secured to the lower side of the horizontal portion 2 and is arranged to penetrate the earth 6 to support the body 1 against rotation after being mounted in the earth as shown in FIGURE II.

The downwardly extending member 5 may take the form of a gusset extending between the horizontal portion 2 and the vertical portion 3, or it may be a plate or rod-like member secured to the lower side of the horizontal portion 2 and extending downwardly therefrom so that it will penetrate the soil and prevent rotation of the body 1.

An underground horizontally disposed water supply pipe 7 is connected to the riser pipe 8, which extends above the surface of the ground 6, and has a water faucet and valve 9 secured thereto in horizontal position.

The riser pipe 8 is attached to the uprght porton 1a of the body 1 by means of a suitable strap clamp 12, which is drawn tightly thereabout, to secure the riser pipe 8 to the upright portion 1a of body 1, and thereby mount the riser pipe 8 in secure upright position so that it will be supported by the upright portion 1a.

An appropriate storage hook 10 is secured to the upper end of the upright memebr 1a, whereon the flexible rubber or plastic hose 11 may be stored by winding it thereabout.

It will be observed that the hose 11 may be stored on the hook 10 without disconnecting the hose from the faucet 9, and that the hose is stored in position so that it is not in the way of mowing the lawn or otherwise utilizing the lawn space. It occupies no more ground space than the faucet would normally occupy.

The hose storage rack is mounted adjacent the faucet 9, by pressing the pointed end 4 of the vertical portion 3 into the earth and causing the downwardly extending gusset 5 and the horizontal portion 2 to penetrate the soil so that the horizontal portion 2 is preferably slightly beneath the surface of the turf. Preferably the gusset 5, or other downwardly extending member, has a sharpened or pointed lower end or edge, so that it will facilitate the penetration of the earth and will guide the horizontal portion 2 into penetrating relationship to the soil.

After so mounting the device, it may be secured to the riser pipe 8 of the faucet 9 by means of the clamp 12 extended about the riser pipe and about the upright member 1a.

In FIGURE III the hose rack hereinbefore described is shown mounted adjacent the foundation and wall of a house and is secured to a faucet 13 which is attached to a riser pipe 8a which is attached to a horizontal water supply pipe 7a extending through the wall 15 of the house adjacent the foundation 14. The faucet and horizontal pipe to which it is secured is connected to the upright portion 1a of the body 1 by means of a suitable strap clamp 16, secured thereabout.

It will be observed that the horizontal portion 2 permits the vertical penetrating portion 5 to be pushed into the earth at a point spaced from the foundation, but allows the vertical portion 1a to extend upwardly adjacent the wall of the house so that it can be attached to the riser pipe 8a. This permits a firm mounting for the faucet, and ease in mounting, yet provides a mounting which does not permit the hose rack to rotate by reason of the penetrating engagement of the downwardly extending portion 5 and horizontal portion 2 into the earth. The securely mounted hose rack also provides the function of securing the faucet 13 and horizontally extending pipe 7a against outward movement from the wall of the house 15. A common problem with such faucet mountings is that by pulling upon the hose 11 while in use, the faucet and pipe to which it is joined are pulled out through the passage in the wall 15 where the pipe is exposed to freezing temperatuers, or may be broken or tiwsted off.

The mounting device, comprising the upright member 1a, the horizontal member 2 and the vertical member 3, including the brace or support 5 has other uses than a hose and faucet support.

For instance, clamps 17, shown in FIGURE IV, may be attached to the upright member 1a which includes a loop 18 adjustably secured about a tree 23 to support same. The loop 18 preferably is covered with rubber or plastic material to protect the tree against abrasion. The clamps 17 embrace the upright member 1a and is clamped thereto by the bolts 21 and 22, which may be loosened to adjust the clamps vertically on the upright member 1a to accommodate different heights of trees and to adjust same as the tree grows. The hook 10 could be dispensed with in this use.

In such use the vertical ground penetrating member 3 is pushed into the ground in spaced relationship to the trunk of the tree and the horizontal portion permits the upright member 1a to extend upwardly immediately adjacent the tree. The horizontal member 2 and the brace member 5 are pushed into the soil to prevent it from rotating. It will be noted that the ground penetrating portion 3 is spaced from the roots 24 of the tree or is spaced from the ball of a newly planted tree.

It will thus be seen that I have provided a rack or brace member which may be firmly mounted in the ground to support a hose or other member in a manner that it will not rotate or move laterally, and provides a secure mounting for the member supported thereby.

It will be understood that other and further embodiments of my invention may be devised without departing from the spirit and scope of the appended claims.

Having described my invention I claim:

1. In a support device, an elongated body, the upper portion of the body providing a support portion, said body being deflected laterally near its lower end ti provide a horizontally extending portion, and being further deflected vertically at the outer end of the horizontally extending portion to provide a ground penetrating portion; a ground penetrating stabilizer member extending downwardly from the horizontal portion intermediate the ends thereof, arranged to penetrate the ground and resist lateral rotation of the support device; and a support member attached to the upper end of the support portion.

2. The combination called for in claim 1 wherein the ground penetrating stabilizer member is a gusset extending between the horizontal portion and the ground penetrating portion, said gusset being sharpened along its lower surface.

3. The combination called for in claim 1 wherein the support member is a hook.

4. The combination called for in claim 1 with the addition of a clamp vertically adjustable on the support portion.

5. The combination with a building wall having a pipe extending therethrough, and a vertically disposed pipe exteriorly of the wall, with a faucet extending outwardly therefrom; a support device including an elongated body having an elongated upper support portion; said body being deflected laterally near the lower end to provide a horizontal portion and being further deflected vertically at the outer end of the horizontal portion to provide a ground penetrating portion; a ground penetrating stabilizer member extending downwardly from the horizontal portion intermediate the ends thereof arranged to penetrate the ground to prevent lateral rotation of the support device, a garden hose receiving hook attached to the upper end of the support device; and a clamp extending about the vertically disposed pipe and secured about the lower end of the elongated upper support portion to thereby attach the support device to the vertically disposed pipe adjacent the faucet.

6. In combination with a water faucet including a vertically disposed pipe communicating with the water faucet, a support device including an elongated body having an elongated upper support portion; said body being deflected laterally near the lower end to provide a horizontal portion and being further deflected vertically at the outer end of the horizontal portion to provide a ground penetrating portion; a ground penetrating stabilizer member extending downwardly from the horizontal portion intermediate the ends thereof arranged to penetrate the ground to prevent lateral rotation of the support device, a garden hose receiving hook attached to the upper end of the support device; and a clamp extending about the vertically disposed pipe and secured about the lower end of the elongated upper support portion to thereby attach the support device to the vertically disposed pipe adjacent the faucet.

7. In a support device, an elongated body including an elongated upwardly extending support portion, said body being deflected laterally near its lower end to provide a horizontal portion and being further deflected vertically at the outer end of the horizontal portion to provide a ground penetrating portion; a gusset extending between the horizontal portion and the ground penetrating portion, said gusset being sharpened on its lower edge; a garden hose receiving hook at the upper end of the support portion; and means to secure the lower end of the support portion to a water faucet.

References Cited by the Examiner

UNITED STATES PATENTS

| | | | |
|---|---|---|---|
| D. 167,218 | 7/1952 | Miller et al. | 248—88 X |
| 1,537,237 | 5/1925 | Kaestner | 248—87 |
| 2,454,458 | 11/1948 | Kaether | 248—42 |
| 2,942,822 | 6/1960 | Crow | 248—88 |
| 2,993,671 | 7/1961 | Knebusch | 248—87 |
| 3,075,733 | 1/1963 | Kimmel | 248—96 |
| 3,113,723 | 12/1963 | Arnt | 239—29 |

FOREIGN PATENTS

| | | |
|---|---|---|
| 922,446 | 1/1955 | Germany. |
| 9,893 | 1884 | Great Britain. |

CLAUDE A. LE ROY, *Primary Examiner.*

R. P. SEITTER, *Assistant Examiner.*